US010149360B2

(12) United States Patent
Hirowatari

(10) Patent No.: US 10,149,360 B2
(45) Date of Patent: Dec. 4, 2018

(54) LIGHTING CONTROL SYSTEM, LIGHTING CONTROL METHOD, CONTROL DEVICE, AND CONTROL METHOD

(71) Applicant: PANASONIC INTELLECTUAL PROPERTY MANAGEMENT CO., LTD., Osaka (JP)

(72) Inventor: Yuichirou Hirowatari, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/851,408

(22) Filed: Dec. 21, 2017

(65) Prior Publication Data

US 2018/0199408 A1 Jul. 12, 2018

(30) Foreign Application Priority Data

Jan. 6, 2017 (JP) ................................ 2017-000909

(51) Int. Cl.

*H05B 33/08* (2006.01)
*H05B 37/02* (2006.01)
*G01J 1/42* (2006.01)

(52) U.S. Cl.

CPC ..... *H05B 33/0845* (2013.01); *H05B 33/0854* (2013.01); *H05B 37/0272* (2013.01)

(58) Field of Classification Search

CPC ............ H05B 33/0845; H05B 33/0854; H05B 33/0272

See application file for complete search history.

(56) References Cited

U.S. PATENT DOCUMENTS

2013/0264954 A1* 10/2013 Chung ................ H05B 33/083 315/186
2015/0181662 A1* 6/2015 Ghoshal ................ G01J 1/4204 315/149
2017/0027044 A1* 1/2017 Kim .................. H05B 33/0845
2017/0105266 A1* 4/2017 Sadwick ........... H05B 37/0218

FOREIGN PATENT DOCUMENTS

JP 2008-181762 A 8/2008

* cited by examiner

*Primary Examiner* — Dedei K Hammond
*Assistant Examiner* — Raymond R Chai
(74) *Attorney, Agent, or Firm* — McDermott Will & Emery LLP

(57) ABSTRACT

A lighting control system includes: a first control device; a detector; a second control device; and a lighting device. The first control device transmits a PWM signal to the second control device. The second control device receives the PWM signal and acquires a detection signal indicating a detection result of the detector, and transmits to the lighting device a dimming signal corresponding to either one of the PWM signal or the detection signal. The PWM signal includes either one of a dimming PWM signal whose duty ratio is within a predetermined range or a detection control PWM signal whose duty ratio is outside the predetermined range. When the dimming PWM signal is received, the second control device performs dimming control on the lighting device, and when the detection control PWM signal is received, the second control device performs lighting control on the lighting device according to the detection signal.

13 Claims, 5 Drawing Sheets

LIGHTING CONTROL SYSTEM, LIGHTING CONTROL METHOD, CONTROL DEVICE, AND CONTROL METHOD

CROSS REFERENCE TO RELATED APPLICATION

This application claims the benefit of priority of Japanese Patent Application Number 2017-000909 filed on Jan. 6, 2017, the entire content of which is hereby incorporated by reference.

BACKGROUND

1. Technical Field

The present disclosure relates to a lighting control system, a lighting control method, a control device, and a control method.

2. Description of the Related Art

As a means for controlling the brightness of a lighting device, there is a known method of instructing to the lighting device a dimming level indicating the brightness of light to be emitted by the lighting device, by changing the duty ratio of a pulse width modulation (PWM) signal (for example, Japanese Unexamined Patent Application Publication No. 2008-181762 (Patent Literature (PTL) 1)).

PTL 1 discloses a lighting control device that: generates a first dimming signal according to a dimming signal from a remote control; determines whether or not the first dimming signal is within a dimming range assigned to a lighting device; and when the first dimming signal is outside the dimming range, determines that an abnormal condition has occurred and outputs an abnormality notifying signal.

SUMMARY

With such a lighting control device as disclosed in PTL 1, it is possible to perform, using a single PWM signal, not only normal dimming control but also, when an abnormal condition occurs, lighting control corresponding to the abnormal condition on the lighting device, by outputting an abnormality notifying signal. That is to say, a single PWM signal can be used as a signal for the normal dimming control and a signal for the output of the abnormality notifying signal. It is, however, difficult to further use the same PWM signal for, for example, lighting control according to a detection result of a detector such as a human sensor or an illuminance sensor, other than the use as the abnormality notifying signal.

The present disclosure has been conceived in view of the above circumstances, and has an object to provide a lighting control system, a lighting control method, a control device, and a control method that allow use of a single PWM signal not only as a signal for normal dimming control and a signal for an abnormal condition, but also as a signal for lighting control according to a detection result of a detector.

A lighting control system according to the present disclosure includes: a first control device; a detector; a second control device; and a lighting device. The first control device transmits a PWM signal to the second control device. Here, the PWM signal is a signal instructing a dimming level to the lighting device, and the dimming level is a brightness of light to be emitted by the lighting device. The second control device receives the PWM signal from the first control device and acquires a detection signal indicating a detection result of the detector, and transmits to the lighting device a dimming signal corresponding to either one of the PWM signal or the detection signal. Lighting control is performed on the lighting device based on the dimming signal. The PWM signal transmitted by the first control device includes either one of (i) a dimming PWM signal whose duty ratio is within a predetermined range or (ii) a detection control PWM signal whose duty ratio is outside the predetermined range. When the second control device receives the dimming PWM signal, the second control device performs dimming control on the lighting device by transmitting to the lighting device the dimming signal corresponding to the duty ratio of the dimming PWM signal. When the second control device receives the detection control PWM signal, the second control device performs lighting control on the lighting device according to the detection signal acquired, by transmitting to the lighting device the dimming signal corresponding to the detection signal.

A lighting control method according to the present disclosure is a lighting control method of controlling an operation of a lighting control system. The lighting control system includes: a first control device; a detector; a second control device; and a lighting device. The lighting control method includes: transmitting, by the first control device, a PWM signal to the second control device, the PWM signal instructing a dimming level to the lighting device, the dimming level being a brightness of light to be emitted by the lighting device; receiving, by the second control device, the PWM signal from the first control device and acquiring, by the second control device, a detection signal indicating a detection result of the detector, and transmitting, by the second control device, a dimming signal corresponding to either one of the PWM signal or the detection signal to the lighting device; and performing lighting control on the lighting device based on the dimming signal. The PWM signal transmitted by the first control device includes a dimming PWM signal whose duty ratio is within a predetermined range and a detection control PWM signal whose duty ratio is outside the predetermined range. The performing of the lighting control includes: performing, by the second control device when the second control device receives the dimming PWM signal, dimming control on the lighting device by transmitting to the lighting device the dimming signal corresponding to the duty ratio of the dimming PWM signal; and performing, by the second control device when the second control device receives the detection control PWM signal, lighting control on the lighting device according to the detection signal acquired, by transmitting to the lighting device the dimming signal corresponding to the detection signal.

A control device according to the present disclosure includes: a detector; a receiver that receives a PWM signal transmitted from an external control device and acquires a detection signal indicating a detection result of the detector; and a transmitter that transmits a dimming signal corresponding to either one of the PWM signal or the detection signal. When the receiver receives the PWM signal, the transmitter transmits the dimming signal corresponding to the PWM signal received. When the receiver acquires the detection signal, the transmitter transmits the dimming signal corresponding to the detection signal acquired.

A control method according to the present disclosure is a control method of controlling an operation of a control device. The control device includes: a detector; a receiver that receives a PWM signal transmitted from an external control device and acquires a detection signal indicating a detection result of the detector; and a transmitter that transmits a dimming signal corresponding to either one of the PWM signal or the detection signal. The control method includes: transmitting, by the transmitter when the receiver receives the PWM signal, the dimming signal corresponding to the PWM signal received; and transmitting, by the transmitter when the receiver acquires the detection signal, the dimming signal corresponding to the detection signal acquired.

According to the present disclosure, it is possible to use a single PWM signal not only as a signal for normal dimming control and a signal for an abnormal condition, but also as a signal for lighting control according to a detection result of a detector.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF EMBODIMENT

Hereinafter, a lighting control system according to an embodiment of the present disclosure will be described in detail with reference to the drawings. Note that the embodiment described below illustrates a specific example of the present disclosure. Therefore, the numerical values, shapes, materials, structural elements, the arrangement and connection of the structural elements, steps (processes), the processing order of the steps, etc., illustrated in the embodiment below are mere examples, and are not intended to limit the present disclosure. As such, among the structural elements in the embodiment below, structural elements not recited in any one of the independent claims defining the most generic concepts of the present disclosure are described as arbitrary structural elements.

Each figure is a schematic illustration and not necessarily a precise illustration. Furthermore, throughout the figures, the same structural elements share the same reference signs.

Embodiment

The present embodiment describes lighting control system 1 that controls lighting device 30 using first control device 10 and second control device 20.

[1. Overview]

Figure 1:
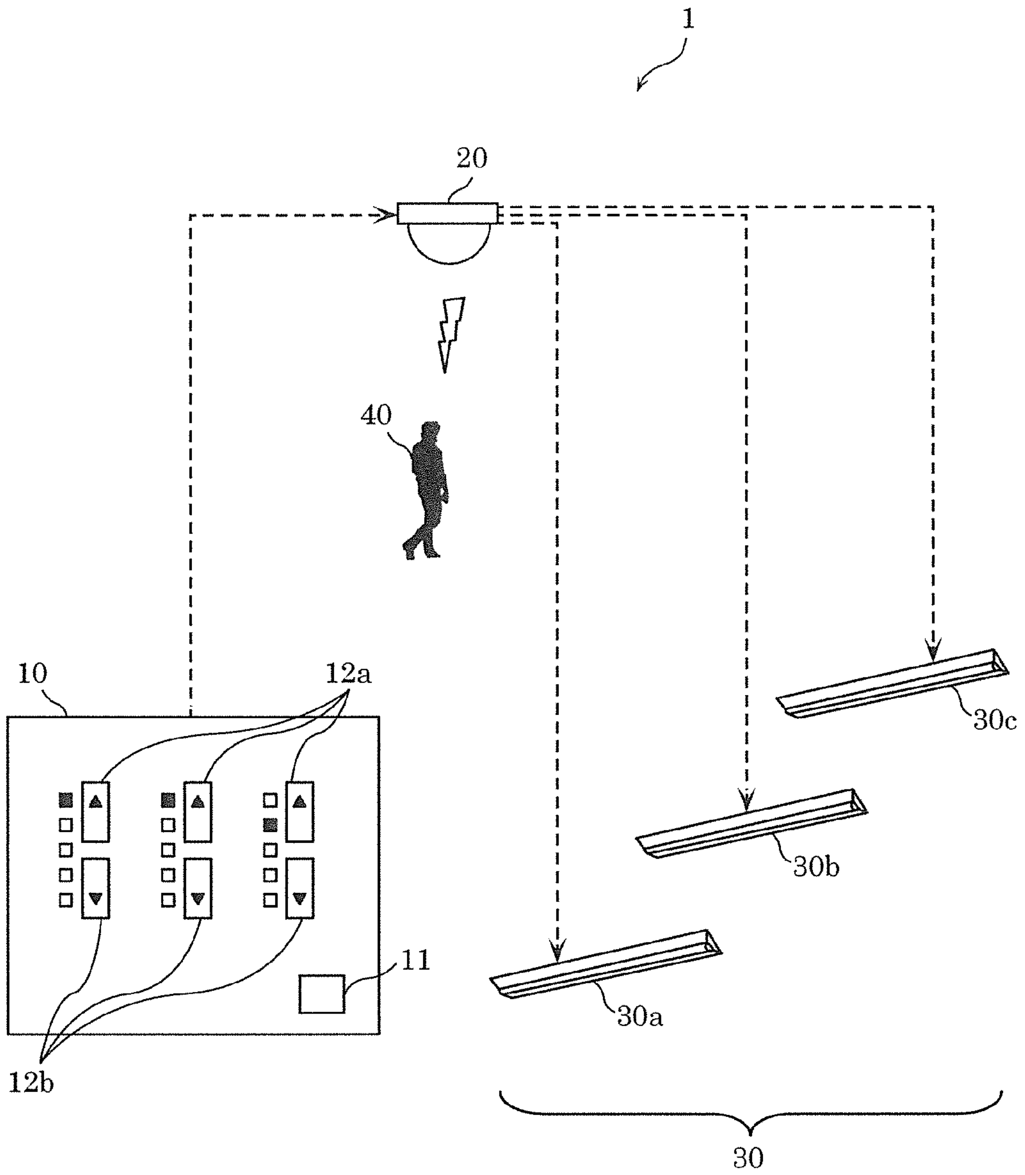
FIG. 1 illustrates an example of a lighting control system according to an embodiment.

FIG. 1 illustrates an example of lighting control system 1 according to the present embodiment.

As illustrated in FIG. 1, lighting control system 1 according to the present embodiment includes first control device 10, second control device 20, and lighting device 30 (30*a*, 30*b*, and 30*c*).

First control device 10 wirelessly transmits, to second control device 20, a PWM signal instructing, to lighting device 30, a dimming level that is a brightness of light to be emitted by lighting device 30. First control device 10 performs lighting control on lighting device 30 via second control device 20. The lighting control on lighting device 30 includes: turn-on control, that is, causing lighting device 30 to emit illumination light; turn-off control, that is, causing lighting device 30 not to emit the illumination light; flashing control, that is, causing lighting device 30 to repeat emission and non-emission of the illumination light; dimming control, that is, changing or adjusting the intensity of the illumination light; and toning control, that is, changing or adjusting the hue of the illumination light, for example.

Although the details will be described later, the PWM signal transmitted by first control device 10 includes either one of (i) a dimming PWM signal whose duty ratio is within a predetermined range or (ii) a detection control PWM signal whose duty ratio is outside the predetermined range.

First control device 10 includes, for example, power switch 11 and dimming switches 12*a* and 12*b*. First control device 10 is realized by, for example, a tablet terminal or a specially-developed controller terminal. As illustrated in FIG. 1, first control device 10 includes power switch 11 and dimming switches 12*a* and 12*b* on the tablet terminal or the controller terminal. As a user operates power switch 11 or dimming switches 12*a* and 12*b*, the operation of lighting device 30 is controlled.

Second control device 20 receives the PWM signal from first control device 10, and performs lighting control on lighting device 30 by transmitting to lighting device 30 a dimming signal corresponding to the value of the duty ratio of the PWM signal. Further, second control device 20 includes detector 202 that detects a detection target, and performs lighting control on lighting device 30 by transmitting to lighting device 30 a dimming signal corresponding to a detection signal indicating a detection result of detector 202. In such a manner, lighting control is performed on lighting device 30 based on the dimming signal. Second control device 20 includes, as detector 202, at least one of a human sensor and an illuminance sensor, for example. Note that second control device 20 and detector 202 may be separately provided.

Although the details will be described later, when second control device 20 receives the dimming PWM signal, second control device 20 performs dimming control on lighting device 30 by transmitting to lighting device 30 a dimming signal corresponding to the duty ratio of the dimming PWM signal. When second control device 20 receives the detection control PWM signal, second control device 20 performs lighting control on lighting device 30 according to the detection signal acquired, by transmitting to lighting device 30 a dimming signal corresponding to the detection signal.

Lighting device 30 is supplied with power and emits light using the power supplied. The operation of lighting device 30 is changed according to an operation on power switch 11 or dimming switches 12*a* and 12*b* of first control device 10.

Lighting device 30 wirelessly communicates with second control device 20. By establishing a wireless communication connection with second control device 20, lighting device 30 receives an instruction for the operation of lighting device 30 from first control device 10 via second control device 20, and operates according to the instruction received.

Note that lighting control system 1 illustrated in FIG. 1 includes three lighting devices 30, and first control device 10 includes dimming switches 12*a* and 12*b* for each lighting device 30 so that lighting devices 30 are individually controlled. The configurations of lighting devices 30 and the switches of first control device 10, however, are not limited to this example.

[2. Functional Configuration]

Figure 2:
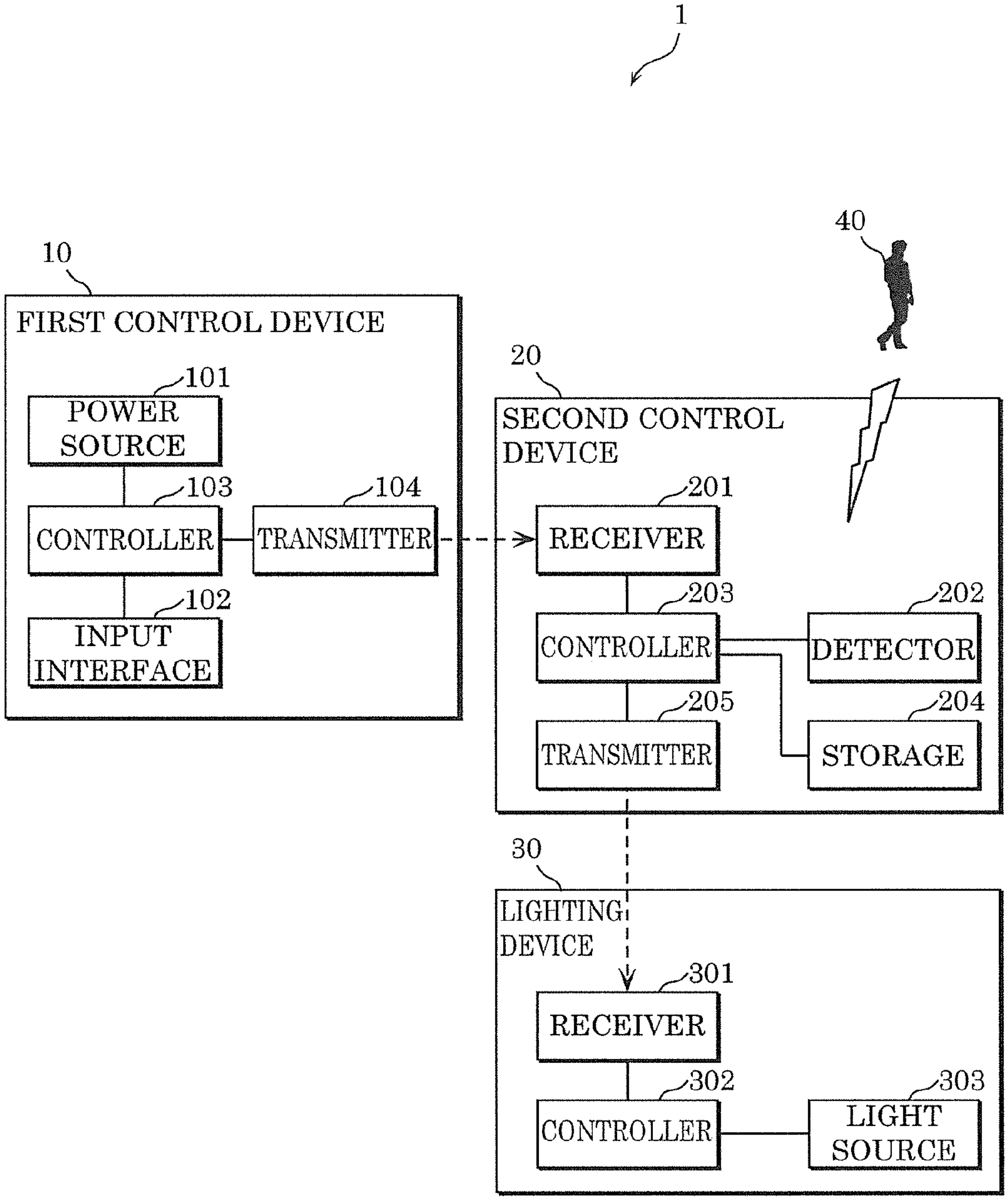
FIG. 2 is a block diagram of a relevant portion of the lighting control system according to the embodiment.

FIG. 2 is a block diagram of a relevant portion of lighting control system 1 according to the present embodiment.

As illustrated in FIG. 2, first control device 10 includes power source 101, input interface 102, controller 103, and transmitter 104.

Power source 101 turns the illumination light of lighting device 30 on or off. Specifically, power source 101 is connected to an external power source (not illustrated) and transitions between ON state and OFF state to supply and not supply power to lighting device 30, thereby turning the illumination light of lighting device 30 on or off.

Power source 101 is realized by, for example, power switch 11 illustrated in FIG. 1. When the user presses power switch 11 to ON state, power is supplied to lighting control system 1 as a whole, the illumination light of lighting device 30 is turned on, and controller 103 controls the operation of lighting device 30. Then, when the user presses power switch 11 to OFF state, the power supply stops, and the illumination light of lighting device 30 is turned off. In such a manner, turning power switch 11 on and off enables lighting control on lighting device 30 such as turning the illumination light of lighting device 30 on and off.

Input interface 102 receives a dimming input and transmits to controller 103 a signal for lighting control on lighting device 30. Input interface 102 is realized by, for example, dimming switches 12*a* and 12*b* illustrated in FIG. 1. Input interface 102 includes, for example, up-arrow dimming switches 12*a* and down-arrow dimming switches 12*b*. When the user presses one of these dimming switches, a signal for dimming lighting device 30 is transmitted to controller 103. For example, pressing dimming switch 12*a* makes the illumination light of lighting device 30 brighter, whereas pressing dimming switch 12*b* makes the illumination light of lighting device 30 darker. As a result, the brightness of the illumination light of lighting device 30 is changed according to the signal received for lighting control on lighting device 30 (for example, a signal for dimming control).

Note that input interface 102 may enable not only dimming of lighting device 30 but also toning of lighting device 30, for example. Although input interface 102 is realized by switches in the present embodiment, input interface 102 may be a slide bar or a handle plate. The configuration of input interface 102 is not limited, so long as it enables dimming or toning of lighting device 30.

Although the details will be described later, when second control device 20 receives a predetermined input from first control device 10, second control device 20 transitions between a state in which second control device 20 does not receive the detection signal and a state in which second control device 20 is ready to receive the detection signal.

Controller 103 transmits, to second control device 20 via transmitter 104, the PWM signal for lighting control on lighting device 30, such as dimming control. Controller 103 receives from input interface 102 the signal for lighting control on lighting device 30, and controls the brightness of lighting device 30 by transmitting to second control device 20 a PWM signal corresponding to the received signal.

Controller 103 is specifically a microcomputer system including a central processing unit (CPU) (processor) and memory such as random-access memory (RAM), read-only memory (ROM), and programmable ROM (P-ROM), and operates according to a program stored in memory (ROM).

The PWM signal transmitted by controller 103 is a voltage signal having a rectangular waveform at a particular frequency. The proportion (t1/T) of ON period t1 of a pulse in a fixed cycle T is referred to as the duty ratio of the PWM signal.

The following describes a relationship between the duty ratio of the PWM signal and the illuminance indicating the brightness of lighting device 30.

The illuminance indicating the brightness of lighting device 30 is determined according to the duty ratio of the PWM signal. Specifically, when first control device 10 instructs a dimming level to lighting device 30, first control device 10 transmits to lighting device 30 the PWM signal whose duty ratio is within a predetermined range.

The predetermined range of the duty ratio of the PWM signal is a range from a first threshold duty ratio to a second threshold duty ratio, both inclusive, the duty cycle outside the predetermined range is either one of a duty cycle less than the first threshold duty ratio or a duty cycle greater than the second threshold duty ratio. The first threshold duty ratio is 5%, for example, and the second threshold duty ratio is 95%, for example. That is to say, the predetermined range is a range from the first threshold duty ratio to the second threshold duty ratio, both inclusive, and is a range from 5% to 95%, both inclusive (at least 5% and at most 95%). At this time, the illuminance corresponds to a range from 100% to 0%, both inclusive. The illuminance of lighting device 30 reduces from 100% to 0% as the duty ratio of the PWM signal increases from 5% to 95%. That is to say, the greater the duty ratio of the PWM signal is, the smaller the illuminance of lighting device 30 becomes, and the darker lighting device 30 is dimmed. As described above, the PWM signal transmitted by first control device 10 includes a dimming PWM signal whose duty ratio is within the predetermined range (from 5% to 95%, both inclusive) and which is for dimming lighting device 30. The mode in which first control device 10 transmits the dimming PWM signal is hereinafter referred to as a normal mode. Note that the range of the PWM signal duty ratio, from 5% to 95%, both inclusive, may correspond to a range of the illuminance from 0% to 100%, both inclusive. In other words, the illuminance may increase from 0% to 100% as the duty ratio of the PWM signal increases from 5% to 95%. That is to say, it may be that the greater the duty ratio of the PWM signal is, the greater the illuminance of lighting device 30 becomes, and the brighter lighting device 30 is dimmed.

First control device 10 transmits to second control device 20 the PWM signal whose duty ratio is outside the predetermined range, so as to make second control device 20 ready to receive the detection signal from detector 202 and operate according to the detection signal. For example, the duty ratio outside the predetermined range is less than the first threshold duty ratio or greater than the second threshold duty ratio; more specifically, less than 5% or greater than 95%. When the duty ratio of the PWM signal received by second control device 20 is greater than 95%, lighting device 30 temporarily maintains the illuminance at 0%, and second control device 20 becomes ready to receive the detection signal from detector 202. When second control device 20 receives the detection signal, lighting device 30 emits light at full brightness at the illuminance of 100%, for example. When the PWM signal whose duty ratio is less than 5% is transmitted and lighting device 30 maintains the illuminance at 100%, it can be determined that an abnormal condition has occurred in lighting control system 1. The abnormal condition in lighting control system 1 will be described later. As described above, the PWM signal transmitted by first control device 10 includes a detection control PWM signal whose duty ratio is outside the predetermined range (less than 5% or greater than 95%) and which makes second control device 20 ready to receive the detection signal from detector 202. The mode in which first control device 10 transmits the detection control PWM signal is hereinafter referred to as a sensor mode.

Transition between the normal mode and the sensor mode is made when second control device 20 receives a predetermined input from first control device 10. The following describes the input for the mode transition.

In the present embodiment, a transition is made from the normal mode to the sensor mode when the user holds down dimming switch 12*b* of input interface 102. Specifically, in the normal mode, the user holds down dimming switch 12*b* for a predetermined time period (for example, three seconds). With this, first control device 10 transmits the PWM signal (the detection control PWM signal) whose duty ratio is less than 5% or greater than 95% to second control device 20, and second control device 20 becomes ready to receive a detection signal from detector 202. Lighting device 30 is then controlled based on the detection signal indicating a detection result of detector 202.

Note that the time period for which dimming switch 12*b* is held down to make a transition to the sensor mode is not limited to the example above. The design for the configuration can be changed as appropriate. For example, a switch may be separately provided for the mode transition.

Transmitter 104 transmits the dimming PWM signal or the detection control PWM signal to second control device 20. At this time, for each of lighting devices 30 that are individually associated with dimming switches 12*a* and 12*b*, transmitter 104 transmits the dimming PWM signal or the detection control PWM signal via second control device 20.

As illustrated in FIG. 2, second control device 20 includes receiver 201, detector 202, controller 203, storage 204, and transmitter 205.

Receiver 201 wirelessly receives the PWM signal (the dimming PWM signal or the detection control PWM signal) transmitted from first control device 10. Receiver 201 is specifically a wireless communication interface for wireless communication. The dimming PWM signal or the detection control PWM signal received is transmitted to controller 203.

Specified low power communication is used for the wireless communication. The wireless communication may be, for example, a wireless local area network (LAN) of the IEEE 802.11a, b, g standard, ZigBee (registered trademark), Z-Wave (registered trademark), or KNX (registered trademark). The devices that perform wireless communication establish a wireless communication connection with each other by pairing.

In the sensor mode, that is, when receiver 201 receives the detection control PWM signal, detector 202 detects detection target 40 within a detection range of detector 202, and transmits to controller 203 a detection signal indicating the detection result. Note that detector 202 may transmit the detection signal to controller 203 via receiver 201. In other words, receiver 201 may receive the detection signal. The operation of lighting device 30 is controlled based on the detection signal.

Detector 202 is specifically an illuminance sensor or a human sensor. When detector 202 is an illuminance sensor, detection target 40 is the illuminance in the vicinity of lighting device 30, and detector 202 detects a change in the illuminance as the detection signal. The illuminance sensor is, for example, a general purpose sensor module using a photodiode. When detector 202 is a human sensor, detection target 40 is the presence of a person in the vicinity of lighting device 30, and detector 202 detects the presence of a person or a state of a person as the detection signal. The human sensor is, for example, a passive sensor, and detects infrared rays radiated from the human body (i.e., detects a temperature change) in the detection range. In such a manner as described, second control device 20 controls lighting device 30 according to the detection signal from detector 202. In the present embodiment, the human sensor is used.

Note that in the normal mode, detector 202 is constantly ready to detect detection target 40 in the detection range. However, even when detector 202 detects detection target 40 in the detection range, detector 202 does not transmit the detection signal to controller 203 unless controller 203 causes a mode transition (that is, unless receiver 201 receives the detection control PWM signal). That is to say, in the normal mode, controller 203 gives priority to the control based on the dimming PWM signal from first control device 10.

Controller 203 determines, according to the PWM signal received by receiver 201 for lighting control on lighting device 30, what kind of lighting control is to be performed on lighting device 30. Controller 203 then transmits to lighting device 30 a dimming signal corresponding to this determination. Furthermore, controller 203 causes detector 202 to operate as necessary, determines the details of lighting control to be performed on lighting device 30, according to the detection signal from detector 202, and transmits to lighting device 30 a dimming signal corresponding to the determined details. Controller 203 performs control in the normal mode when the duty ratio of the PWM signal is within a range from 5% to 95%, both inclusive, and performs control in the sensor mode when the duty ratio of the PWM signal is less than 5% or greater than 95%.

When it is determined that the current mode is the normal mode (that is, when receiver 201 has not received the detection control PWM signal), controller 203 controls lighting device 30 according to the duty ratio of the dimming PWM signal. Controller 203 analyzes the dimming PWM signal to determine the illuminance based on the dimming PWM signal, and transmits the determined illuminance to lighting device 30 as the dimming signal.

When it is determined that the current mode is the sensor mode (that is, when receiver 201 has received the detection control PWM signal), controller 203 controls lighting device 30 according to the detection signal from detector 202. Controller 203 causes itself to be ready to receive the detection signal from detector 202, and transmits, as the dimming signal, a signal related to a preset illuminance to lighting device 30 according to the detection signal received from detector 202. For example, when the detection signal indicates that a person has been detected, the dimming signal causes the illumination light of lighting device 30 to be turned on, whereas when the detection signal indicates that no person has been detected, the dimming signal causes the illumination light of lighting device 30 to be turned off.

The transition between the normal mode and the sensor mode is made upon reception, by first control device 10, of the predetermined input as described above.

Storage 204 stores information (such as a program) which indicates, for example, the details of control to be performed on lighting device 30 and is to be transmitted to lighting device 30 via transmitter 205. Storage 204 is specifically memory, for example. Note that storage 204 may be included in controller 203. For example, controller 203 is a microcomputer system including a CPU (processor) and storage 204 (memory such as RAM, ROM, and P-ROM), and operates according to a program stored in memory (ROM). When receiver 201 receives the PWM signal, controller 203 determines, based on the information stored in storage 204, the details of control to be performed on lighting device 30 according to the duty ratio of the PWM signal or the detection signal. Controller 203 then transmits the determined details to lighting device 30 as the dimming signal.

Transmitter 205 transmits to lighting device 30 the dimming signal corresponding to the dimming PWM signal or the detection control PWM signal.

As illustrated in FIG. 2, lighting device 30 includes receiver 301, controller 302, and light source 303.

Receiver 301 wirelessly receives the dimming signal from second control device 20. Receiver 301 is specifically a wireless communication interface for wireless communication.

The wireless communication is, for example, a wireless local area network (LAN) of the IEEE 802.11a, b, g standard, ZigBee (registered trademark), Z-Wave (registered trademark), or KNX (registered trademark).

The devices that perform wireless communication establish a wireless communication connection with each other by pairing.

Note that the wireless communication includes not only direct wireless communication between receiver 301 and second control device 20, but also indirect communication relayed by another device (also referred to as multihop communication). A device that performs the multihop communication transfers a communication packet received from a wireless communication partner to another wireless communication partner, and holds route information that is information for the transfer. The communication route for the multihop communication may be of a star type, a tree type, or a mesh type, for example.

Controller 302 receives the dimming signal for lighting control on lighting device 30 via receiver 301, and controls the operation of lighting device 30 according to the dimming signal received.

Light source 303 performs an operation such as emission or non-emission of illumination light, based on the control by controller 302. Light source 303 is realized by a light emitting diode (LED) or an organic electro-luminescent (EL) element, for example.

[3. Processing]

Figure 3:
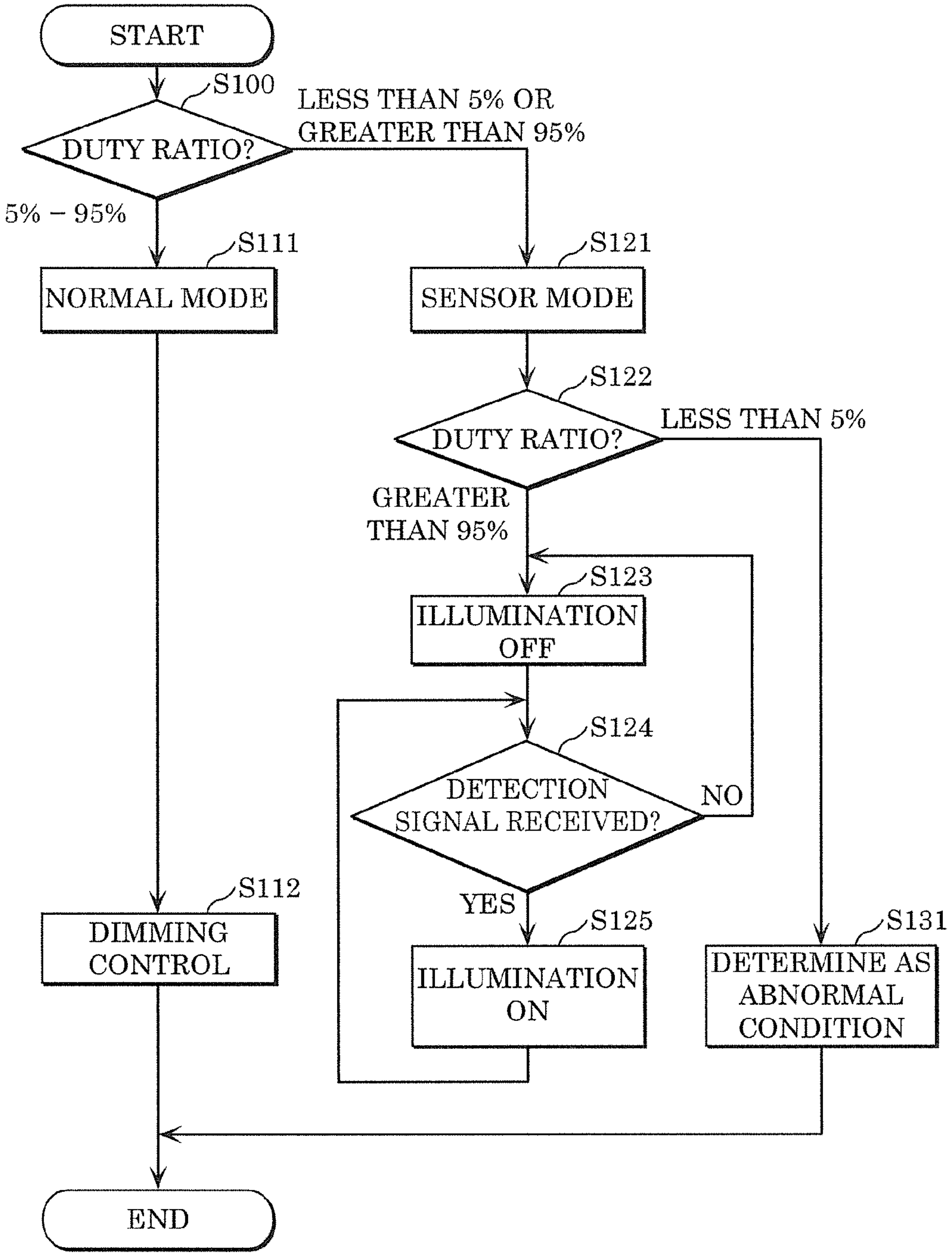
FIG. 3 is a flow chart illustrating an example of an operation of the lighting control system according to the embodiment.

FIG. 3 is a flow chart illustrating an example of an operation of lighting control system 1 according to the present embodiment. The processing of lighting control system I will be described with reference to the flow chart in FIG. 3.

Lighting control system 1 according to the present embodiment controls lighting device 30 using the PWM signal, while switching between dimming control according to dimming switches 12*a* and 12*b* and lighting control according to the detection signal.

First, by operating power source 101 of first control device 10 and turning the power source on, power is supplied to second control device 20 and lighting device 30, and lighting device 30 starts to be controlled.

First control device 10 transmits a PWM signal to second control device 20 (signal transmission step). The duty ratio of the PWM signal is changed as appropriate according to an input on input interface 102. Furthermore, upon reception, by first control device 10 (input interface 102), of a predetermined input, a transition is made between the normal mode and the sensor mode (transition step). Specifically, when a transition is made to the normal mode, first control device 10 transmits a dimming PWM signal whose duty ratio is within a predetermined range (for example, in a range from 5% to 95%, both inclusive) that is changed as appropriate according to an input on input interface 102, whereas when a transition is made to the sensor mode, first control device 10 transmits a detection control PWM signal whose duty ratio is outside the predetermined range (less than 5% or greater than 95%).

Second control device 20 performs control according to the duty ratio of the PWM signal received. Specifically, second control device 20 determines whether the duty ratio of the PWM signal received is (i) in a range from 5% to 95%, both inclusive or (ii) less than 5% or greater than 95% (control step, Step S100).

When the duty ratio of the PWM signal received is in a range from 5% to 95%, both inclusive ("5%-95%" in Step S100), lighting control system 1 transitions to the normal mode (Step S111), and second control device 20 performs control on the dimming level of lighting device 30 (dimming control) by transmitting to lighting device 30 a dimming signal corresponding to the duty ratio within the predetermined range (Step S112).

When the duty ratio of the PWM signal received is less than 5% or greater than 95% ("less than 5% or greater than 95%" in Step S100), lighting control system 1 transitions to the sensor mode (Step S121).

Second control device 20 determines whether the duty ratio of the PWM signal received is (i) greater than 95% or (ii) less than 5% (Step S122).

When lighting control system 1 is in the sensor mode and the duty ratio is greater than 95% ("greater than 95%" in Step S122), the illumination light of lighting device 30 is turned off and second control device 20 becomes ready to receive a detection signal from detector 202 (Step S123). Specifically, second control device 20 stands by to receive a detection signal from detector 202 that detects detection target 40 in a detection range.

Note that immediately after the power is supplied from power source 101, an operation is performed in the normal mode regardless of the value of the PWM signal, and second control device 20 does not receive the detection signal from detector 202 until there is a predetermined input on input interface 102.

When lighting control system 1 is in the sensor mode, second control device 20 determines whether or not the detection signal is received (Step S124).

When the detection signal is received (YES in Step S124), second control device 20 transmits to lighting device 30 a dimming signal corresponding to the detection signal received, and the illumination light of lighting device 30 is turned on (Step S125). In such a manner, when second control device 20 receives the detection control PWM signal, second control device 20 performs lighting control (for example, turn-on control) on lighting device 30 according to the detection signal received.

Specific lighting control on lighting device 30 according to the detection signal includes, for example, causing lighting device 30 to emit the illumination light at the illuminance of 100%; however, the method for the operation control is not limited to the present embodiment, so long as the illumination light of lighting device 30 can be turned on or off according to the dimming signal.

When detector 202 does not detect detection target 40 or when detector 202 no longer detects detection target 40 that has been detected (NO in Step S124), the illumination light of lighting device 30 is turned off and second control device 20 continues to stand by to receive the detection signal (Step S123).

When lighting control system 1 is in the sensor mode and the duty ratio is less than 5% ("less than 5%" in Step S122), the illumination light of lighting device 30 is turned on regardless of the dimming signal, and controller 203 determines that first control device 10 or second control device 20 is in an abnormal condition (Step S131). The "abnormal condition" indicates, for example, that an operation signal transmitted by first control device 10 or second control device 20 is in an abnormal condition or the wireless communication connection among the devices included in lighting control system 1 is in an abnormal condition. Then, lighting control corresponding to the abnormal condition is performed on lighting device 30.

In the sensor mode, the above-described series of processing steps S122 to S125 and S131 is repeated to perform lighting control on lighting device 30 using second control device 20.

Second control device 20 may further perform lighting control on lighting device 30 according to the signal cycle of the PWM signal. Specifically, the determination performed in Step S100 as to whether the PWM signal is the dimming PWM signal or the detection control PWM signal may be made by sampling the signal cycles of the PWM signal for a certain period of time. Note that the signal cycle of the PWM signal refers to a period between a rising edge and the following falling edge of a rectangular wave or a period between a falling edge and the following rising edge of the rectangular wave.

Figure 4:
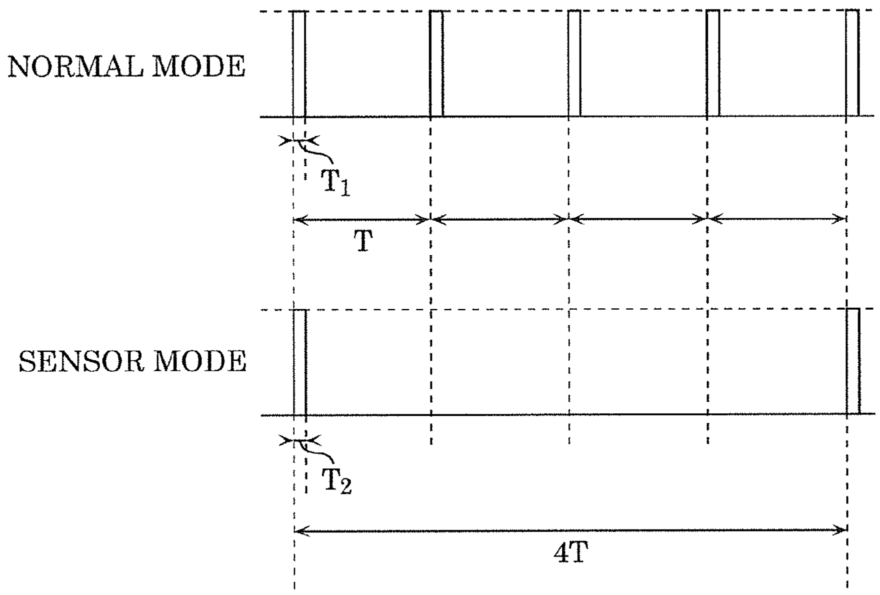
FIG. 4 is a timing diagram of a PWM signal for mode transition determination by the lighting control system according to the embodiment.

FIG. 4 is a timing diagram of the PWM signal for mode transition determination by lighting control system 1 according to the present embodiment. Specifically, as illustrated in FIG. 4, given that one cycle T of the PWM signal output from first control device 10 is, for example, 1 ms, second control device 20 performs the sampling for a period of four cycles 4T, i.e., 4 ms. By determining whether or not the pulse of the PWM signal occurs during the period of 4 ms, second control device 20 determines whether or not to perform control in the sensor mode.

Specifically, when the signal cycle of the PWM signal is a first time period (here, 4 ms, for example) or less, second control device 20 performs control in the normal mode or the sensor mode, whereas when the signal cycle of the PWM signal is not the first time period or less, second control device 20 determines that an abnormal condition has occurred. More specifically, when the signal cycle of the PWM signal is equal to the first time period, second control device 20 performs one of control in the normal mode and control in the sensor mode, whereas when the signal cycle of the PWM signal is equal to a second time period shorter than the first time period, second control device 20 performs the other control. For example, when the duty ratio T1/T of the pulse of the PWM signal is within a range from 5% to 95%, both inclusive and the pulse occurs every 1 ms (the second time period), the processing flow proceeds to Step S111, and the operation in the normal mode starts. On the other hand, when the pulse does not occur every 1 ms but occurs every 4 ms (the first time period), the processing flow proceeds to Step S121, and the operation in the sensor mode starts. Furthermore, when the pulse does not occur every 4 ms, second control device 20 can determine that an abnormal condition has occurred in lighting control system 1.

Note that the sampling cycle is not limited to the above example.

[4. Conclusion]

As described above, lighting control system 1 according to the present embodiment includes: first control device 10; detector 202; second control device 20; and lighting device 30. First control device 10 transmits a PWM signal to second control device 20. Here, the PWM signal is a signal instructing a dimming level to lighting device 30, and the dimming level is a brightness of light to be emitted by lighting device 30. Second control device 20 receives the PWM signal from first control device 10 and acquires a detection signal indicating a detection result of detector 202, and transmits to lighting device 30 a dimming signal corresponding to either one of the PWM signal or the detection signal. Lighting control is performed on lighting device 30 based on the dimming signal. The PWM signal transmitted by first control device 10 includes either one of (i) a dimming PWM signal whose duty ratio is within a predetermined range or (ii) a detection control PWM signal whose duty ratio is outside the predetermined range. When second control device 20 receives the dimming PWM signal, second control device 20 performs dimming control on lighting device 30 by transmitting to lighting device 30 the dimming signal corresponding to the duty ratio of the dimming PWM signal. When second control device 20 receives the detection control PWM signal, second control device 20 performs lighting control on lighting device 30 according to the detection signal acquired, by transmitting to lighting device 30 the dimming signal corresponding to the detection signal.

With this, a single PWM signal can be used not only as a signal for ordinary dimming control and a signal for an abnormal condition, but also as a signal for lighting control according to a detection result of detector 202.

Second control device 20 may become ready to acquire the detection signal from detector 202 when second control device 20 receives the detection control PWM signal.

With this, it is possible to perform, on lighting device 30, lighting control according to a detection result of detector 202 when the detection control PWM signal is received.

First control device 10 may include input interface 102 that receives a dimming input. When second control device 20 receives a predetermined input from first control device 10, second control device 20 may transition between a state in which second control device 20 does not acquire the detection signal and a state in which second control device 20 is ready to acquire the detection signal.

With this, since first control device 10 can cause a transition between the normal mode and the sensor mode without using a separate communication line, lighting device 30 has no need to include a transmitter for each mode. As a result, lighting device 30 can be made simpler and smaller.

The predetermined range of the duty ratio of the PWM signal may be a range from a first threshold duty ratio to a second threshold duty ratio, both inclusive. The duty ratio outside the predetermined range may be either one of a duty ratio less than the first threshold duty ratio or a duty ratio greater than the second threshold duty ratio. When second control device 20 receives the detection control PWM signal whose duty ratio is the duty ratio outside the predetermined range, second control device 20 may perform lighting control on lighting device 30 according to the detection signal acquired, by transmitting to lighting device 30 the dimming signal corresponding to the detection signal.

According to this, a single PWM signal having either one of a duty ratio less than the first threshold duty ratio or a duty ratio greater than the second threshold duty ratio can be used as a signal for lighting control according to a detection result of detector 202, and the same PWM signal having the other of a duty ratio less than the first threshold duty ratio and a duty ratio greater than the second threshold duty ratio can be used as a signal for an abnormal condition.

The first threshold duty ratio may be 5%, and the second threshold duty ratio may be 95%.

With this, the brightness of lighting device 30 can be set minutely within a wide range from 5% to 95%, both inclusive, and lighting device 30 can emit light at the brightness appropriate to the brightness of the area in which lighting device 30 is installed.

Second control device 20 may further perform lighting control on lighting device 30 according to a signal cycle of the PWM signal.

With this, for example, when the signal cycle of the PWM signal is a predetermined first time period or less, it is possible to perform control in the normal mode or the sensor mode, whereas when the signal cycle of the PWM signal is not the predetermined first time period or less, it is possible to determine that an abnormal condition such as a disconnection has occurred in lighting control system 1.

Second control device 20 may wirelessly transmit the dimming signal to lighting device 30.

First control device 10 and second control device 20 may wirelessly communicate bidirectionally.

With this, even when second control device 20 and lighting device 30 are to be installed later, they can be easily installed without additional wiring work.

Detector 202 may include at least one of a human sensor and an illuminance sensor. The detection signal may indicate at least one of (i) presence or absence of a person detected by the human sensor and (ii) an illuminance detected by the illuminance sensor.

With this, it is possible to perform, on lighting device 30, not only the dimming control using a terminal, but also control according to the user's gesture, for example.

The lighting control method according to the present embodiment is a lighting control method of controlling an operation of lighting control system 1. Lighting control system 1 includes: first control device 10; detector 202; second control device 20; and lighting device 30. The lighting control method includes: transmitting, by first control device 10, a pulse width modulation (PWM) signal to second control device 20, the PWM signal instructing a dimming level to lighting device 30, the dimming level being a brightness of light to be emitted by lighting device 30; receiving, by second control device 20, the PWM signal from first control device 10 and acquiring, by second control device 20, a detection signal indicating a detection result of detector 202, and transmitting, by second control device 20, a dimming signal corresponding to either one of the PWM signal or the detection signal to lighting device 30; and performing lighting control on lighting device 30 based on the dimming signal. The PWM signal transmitted by first control device 10 includes either one of a dimming PWM signal whose duty ratio is within a predetermined range or a detection control PWM signal whose duty ratio is outside the predetermined range. The performing of the lighting control includes: performing, by second control device 20 when second control device 20 receives the dimming PWM signal, dimming control on lighting device 30 by transmitting to lighting device 30 the dimming signal corresponding to the duty ratio of the dimming PWM signal; and performing, by second control device 20 when second control device 20 receives the detection control PWM signal, lighting control on lighting device 30 according to the detection signal acquired, by transmitting to lighting device 30 the dimming signal corresponding to the detection signal.

With this, a single PWM signal can be used not only as a signal for ordinary dimming control and a signal for an abnormal condition, but also as a signal for lighting control according to a detection result of detector 202.

The lighting control method may further include receiving a dimming input and transmitting the dimming input to second device 20. When second control device 20 receives a predetermined input in the receiving, second control device 20 may transition between a state in which second control device 20 does not acquire the detection signal and a state in which second control device 20 is ready to acquire the detection signal.

With this, since first control device 10 can cause a transition between the normal mode and the sensor mode without using a separate communication line, lighting device 30 has no need to include a transmitter for each mode. As a result, lighting device 30 can be made simpler and smaller.

The control device (second control device 20) according to the present embodiment includes: detector 202; receiver 201 that receives a PWM signal transmitted from an external control device (first control device 10) and acquires a detection signal indicating a detection result of detector 202; and transmitter 205 that transmits a dimming signal corresponding to either one of the PWM signal or the detection signal. When receiver 201 receives the PWM signal, transmitter 205 transmits the dimming signal corresponding to the PWM signal received. When receiver 201 acquires the detection signal, transmitter 205 transmits the dimming signal corresponding to the detection signal acquired.

The control method according to the present disclosure is a control method of controlling an operation of a control device (second control device 20). The control device includes: detector 202; receiver 201 that receives a PWM signal transmitted from an external control device (first control device 10) and acquires a detection signal indicating a detection result of detector 202; and transmitter 205 that transmits a dimming signal corresponding to either one of the PWM signal or the detection signal. The control method includes: transmitting, by transmitter 205 when receiver 201 receives the PWM signal, the dimming signal corresponding to the PWM signal received; and transmitting, by transmitter 205 when receiver 201 acquires the detection signal, the dimming signal corresponding to the detection signal acquired.

With this, a single PWM signal can be used not only as a signal for ordinary dimming control and a signal for an abnormal condition, but also as a signal for lighting control according to a detection result of detector 202.

Hereinbefore, lighting control system 1 and the related technologies according to the present disclosure have been described based on the above embodiment; however, the present disclosure is not limited to the above embodiment.

For instance, with lighting control system 1 according to the above embodiment, while the communication among first control device 10, second control device 20, and lighting device 30 is wireless communication, this wireless communication may be performed using, for example, radio waves, visible light, infrared rays, or ultraviolet rays.

Note that the relationship between the duty ratio and the illuminance of lighting device 30 is uniquely determined according to the type of lighting device 30. Likewise, the relationship between the illuminance of lighting device 30 dimmed according to an input received by input interface 102 and the duty ratio of the PWM signal is also uniquely determined according to the type of lighting device 30. The relationship is not limited to the present embodiment, so long as the duty ratio of the PWM signal can be divided into two regions, namely, a dimming region in which dimming is performed on lighting device 30 and an external control region in which second control device 20 is ready to receive the detection signal. For example, a PWM signal having a duty ratio in a range from 10% to 90%, both inclusive may be used as a dimming signal in the normal mode, whereas a PWM signal having a duty ratio less than 10% or greater than 90% may be used as a dimming signal for the sensor mode.

Note that the operation of lighting device 30 using second control device 20 may be such that the dimming or toning is controllable, and the control method is not limited to the present embodiment.

Note that the general or specific aspects according to the above embodiment may be realized by a system, a method, an integrated circuit, a computer program, or a computer-readable recording medium such as a compact disc read only memory (CD-ROM), or by any combination of a system, a method, an integrated circuit, a computer program, or a recording medium.

The present disclosure can be realized not only as lighting control system 1 but also as a lighting control method including steps (processes) performed by structural elements included in the lighting control system.

Figure 5:
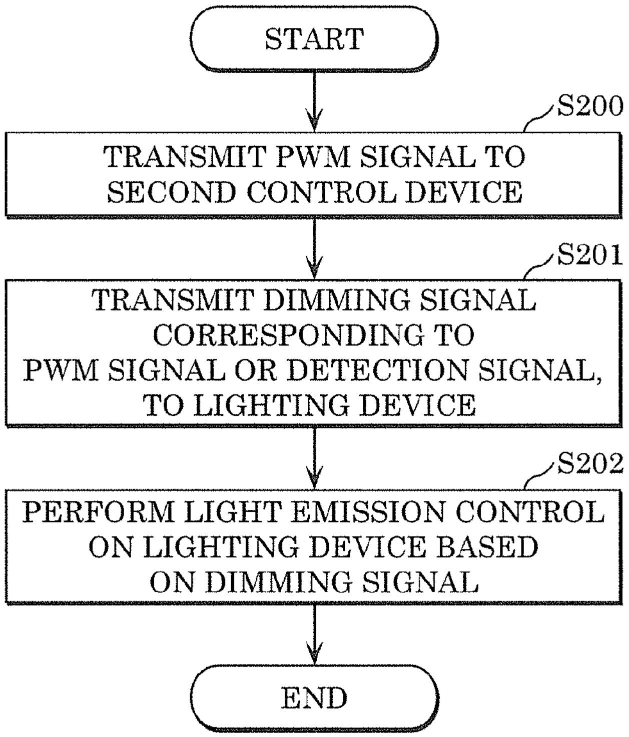
FIG. 5 is a flow chart illustrating an example of a lighting control method according to the embodiment.

Specifically, as illustrated in FIG. 5, the lighting control method is a lighting control method of controlling an operation of lighting control system 1. Lighting control system 1 includes: first control device 10; detector 202, second control device 20; and lighting device 30. The lighting control method includes: transmitting, by first control device 10, a pulse width modulation (PWM) signal to second control device 20, the PWM signal instructing a dimming level to lighting device 30, the dimming level being a brightness of light to be emitted by lighting device 30 (Step S200); receiving, by second control device 20, the PWM signal from first control device 10 and acquiring, by second control device 20, a detection signal indicating a detection result of detector 202, and transmitting, by second control device 20, a dimming signal corresponding to either one of the PWM signal or the detection signal to lighting device 30 (Step S201); and performing lighting control on lighting device 30 based on the dimming signal (Step S202). The PWM signal transmitted by first control device 10 includes either one of a dimming PWM signal whose duty ratio is within a predetermined range or a detection control PWM signal whose duty ratio is outside the predetermined range. The performing of the lighting control includes: performing, by second control device 20 when second control device 20 receives the dimming PWM signal, dimming control on lighting device 30 by transmitting to lighting device 30 the dimming signal corresponding to the duty ratio of the dimming PWM signal; and performing, by second control device 20 when second control device 20 receives the detection control PWM signal, lighting control on lighting device 30 according to the detection signal acquired, by transmitting to lighting device 30 the dimming signal corresponding to the detection signal.

The lighting control method further includes receiving a dimming input. Upon reception of a predetermined input in the receiving, second control device 20 transitions between a state in which second control device 20 does not receive the detection signal and a state in which second control device 20 is ready to receive the detection signal.

Additionally, the present disclosure can be realized not only as a control device (second control device 20) but also as a control method including steps (processes) performed by structural elements included in the control device.

Specifically, the control method is a control method of controlling an operation of a control device (second control device 20). The control device includes: detector 202; receiver 201 that receives a PWM signal transmitted from an external control device and acquires a detection signal indicating a detection result of detector 202; and transmitter 205 that transmits a dimming signal corresponding to either one of the PWM signal or the detection signal. The control method includes: transmitting, by transmitter 205 when receiver 201 receives the PWM signal, the dimming signal corresponding to the PWM signal received; and transmitting, by transmitter 205 when receiver 201 acquires the detection signal, the dimming signal corresponding to the detection signal acquired.

For example, these steps may be executed by a computer (a computer system). The present disclosure can be realized as a program that causes the computer to execute the steps included in the methods described above. The present disclosure can be also realized as a non-transitory computer-readable recording medium, such as a CD-ROM, having the program recorded thereon.

For example, when the present disclosure is realized as a program (software), each step is executed by the program being executed using hardware resources such as a CPU, memory, and an input/output circuit of a computer. In other words, each step is executed by the CPU performing computation on data obtained from, for example, the memory or the input/output circuit, and outputting the result of the computation to, for example, the memory or the input/output circuit.

Each of the plurality of structural elements included in lighting control system 1 according to the above embodiment may be realized as a specialized circuit or a general purpose circuit. These structural elements may be realized as a single circuit or may be realized as a plurality of circuits.

The plurality of structural elements included in lighting control system 1 according to the above embodiment may be realized as large scale integration (LSI) that is an integrated circuit (IC). These structural elements may be realized as a single chip individually or as a single chip that includes some or all of them. LSI is called a system LSI, a super LSI, or an ultra LSI depending on the degree of integration.

The integrated circuit is not limited to LSI, and a specialized circuit or a general purpose processor may be used. It is also possible to use a field programmable gate array (FPGA) that is programmable or a reconfigurable processor that allows reconfiguration of the connection and settings of circuit cells inside LSI.

The present disclosure also encompasses: embodiments achieved by applying various modifications conceivable to those skilled in the art to each embodiment; and embodiments achieved by arbitrarily combining structural elements and functions of each embodiment without departing from the essence of the present disclosure.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A lighting control system, comprising:

a first control device;

a detector;

a second control device; and a lighting device, wherein the first control device transmits a pulse width modulation (PWM) signal to the second control device, the PWM signal instructing a dimming level to the lighting device, the dimming level being a brightness of light to be emitted by the lighting device, the second control device receives the PWM signal from the first control device and acquires a detection signal indicating a detection result of the detector, and transmits to the lighting device a dimming signal corresponding to either one of the PWM signal or the detection signal, lighting control is performed on the lighting device based on the dimming signal, the PWM signal transmitted by the first control device includes either one of (i) a dimming PWM signal whose duty ratio is within a predetermined range or (ii) a detection control PWM signal whose duty ratio is outside the predetermined range, when the second control device receives the dimming PWM signal, the second control device performs dimming control on the lighting device by transmitting to the lighting device the dimming signal corresponding to the duty ratio of the dimming PWM signal, and when the second control device receives the detection control PWM signal, the second control device performs lighting control on the lighting device according to the detection signal acquired, by transmitting to the lighting device the dimming signal corresponding to the detection signal.

2. The lighting control system according to claim 1, wherein the second control device becomes ready to acquire the detection signal from the detector when the second control device receives the detection control PWM signal.

3. The lighting control system according to claim 1, wherein:

the first control device includes an input interface that receives a dimming input and transmits the dimming input to the second control device, and when the second control device receives a predetermined input from the first control device, the second control device transitions between a state in which the second control device does not acquire the detection signal and a state in which the second control device is ready to acquire the detection signal.

4. The lighting control system according to claim 1, wherein:

the predetermined range of the duty ratio of the PWM signal is a range from a first threshold duty ratio to a second threshold duty ratio, both inclusive, the duty cycle outside the predetermined range is either one of a duty cycle less than the first threshold duty ratio or a duty cycle greater than the second threshold duty ratio, and when the second control device receives the detection control PWM signal whose duty ratio is the duty ratio outside the predetermined range, the second control device performs lighting control on the lighting device according to the detection signal acquired, by transmitting to the lighting device the dimming signal corresponding to the detection signal.

5. The lighting control system according to claim 4, wherein the first threshold duty ratio is 5%, and the second threshold duty ratio is 95%.

6. The lighting control system according to claim 1, wherein the second control device further performs lighting control on the lighting device according to a signal cycle of the PWM signal.

7. The lighting control system according to claim 1, wherein the second control device wirelessly transmits the dimming signal to the lighting device.

8. The lighting control system according to claim 1, wherein the first control device and the second control device wirelessly communicate bidirectionally.

9. The lighting control system according to claim 1, wherein:

the detector includes at least one of a human sensor and an illuminance sensor, and the detection signal indicates at least one of (i) presence or absence of a person detected by the human sensor and (ii) an illuminance detected by the illuminance sensor.

10. A lighting control method of controlling an operation of a lighting control system, the lighting control system including: a first control device; a detector; a second control device; and a lighting device, the lighting control method comprising:

transmitting, by the first control device, a pulse width modulation (PWM) signal to the second control device, the PWM signal instructing a dimming level to the lighting device, the dimming level being a brightness of light to be emitted by the lighting device;

receiving, by the second control device, the PWM signal from the first control device and acquiring, by the second control device, a detection signal indicating a detection result of the detector, and transmitting, by the second control device, a dimming signal corresponding to either one of the PWM signal or the detection signal to the lighting device; and performing lighting control on the lighting device based on the dimming signal, wherein the PWM signal transmitted by the first control device includes a dimming PWM signal whose duty ratio is within a predetermined range and a detection control PWM signal whose duty ratio is outside the predetermined range, and the performing of the lighting control includes:

performing, by the second control device when the second control device receives the dimming PWM signal, dimming control on the lighting device by transmitting to the lighting device the dimming signal corresponding to the duty ratio of the dimming PWM signal; and performing, by the second control device when the second control device receives the detection control PWM signal, lighting control on the lighting device according to the detection signal acquired, by transmitting to the lighting device the dimming signal corresponding to the detection signal.

11. The lighting control method according to claim 10, further comprising:

receiving a dimming input and transmitting the dimming input, wherein upon reception of a predetermined input in the receiving, the second control device transitions between a state in which the second control device does not receive the detection signal and a state in which the second control device is ready to receive the detection signal.

12. A control device, comprising:

a detector;

a receiver that receives a pulse width modulation (PWM) signal transmitted from an external control device and acquires a detection signal indicating a detection result of the detector; and a transmitter that transmits a dimming signal corresponding to either one of the PWM signal or the detection signal, wherein the PWM signal includes either one of (i) a dimming PWM signal whose duty ratio is within a predetermined range or (ii) a detection control PWM signal whose duty ratio is outside the predetermined range, when the receiver receives the dimming PWM signal, the transmitter transmits the dimming signal corresponding to the duty ratio of the dimming PWM signal received, and when the receiver receives the detection control PWM signal, the transmitter transmits the dimming signal corresponding to the detection signal acquired.

13. A control method of controlling an operation of a control device, the control device including:

a detector;

a receiver that receives a pulse width modulation (PWM) signal transmitted from an external control device and acquires a detection signal indicating a detection result of the detector; and a transmitter that transmits a dimming signal corresponding to either one of the PWM signal or the detection signal, wherein the PWM signal includes either one of (i) a dimming PWM signal whose duty ratio is within a predetermined range or (ii) a detection control PWM signal whose duty ratio is outside the predetermined range, the control method comprising:

transmitting, by the transmitter when the receiver receives the dimming PWM signal, the dimming signal corresponding to the duty ratio of the dimming PWM signal received; and transmitting, by the transmitter when the receiver receives the detection control PWM signal, the dimming signal corresponding to the detection signal acquired.

* * * * *